United States Patent
Lee et al.

(10) Patent No.: US 12,425,736 B2
(45) Date of Patent: Sep. 23, 2025

(54) APPARATUS AND METHOD OF CONTROLLING CAMERA WITH AUTO-ZOOMING

(71) Applicant: SAMSUNG ELECTRONICS CO., LTD., Suwon-si (KR)

(72) Inventors: Solae Lee, Suwon-si (KR); Sungyoul Park, Suwon-si (KR); Seungin Park, Suwon-si (KR); Changbeom Park, Suwon-si (KR); Hyeongseok Son, Suwon-si (KR); Byung In Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 18/103,831

(22) Filed: Jan. 31, 2023

(65) Prior Publication Data
US 2024/0073529 A1     Feb. 29, 2024

(30) Foreign Application Priority Data
Aug. 30, 2022 (KR) .................. KR10-2022-0109332

(51) Int. Cl.
*H04N 23/69* (2023.01)
*H04N 23/60* (2023.01)
*H04N 23/61* (2023.01)
*H04N 23/62* (2023.01)

(52) U.S. Cl.
CPC ............ *H04N 23/69* (2023.01); *H04N 23/61* (2023.01); *H04N 23/62* (2023.01); *H04N 23/64* (2023.01)

(58) Field of Classification Search
CPC ...... H04N 23/69; H04N 23/61; H04N 23/611; H04N 23/62; H04N 23/64; H04N 23/631; H04N 23/635
See application file for complete search history.

(56) References Cited

U.S. PATENT DOCUMENTS

| 9,661,232 B2 | 5/2017 | Posa et al. |
| 2014/0119601 A1* | 5/2014 | Yoshizumi ............. H04N 23/64 382/103 |
| 2017/0299842 A1* | 10/2017 | Posa ..................... G02B 23/12 |

(Continued)

FOREIGN PATENT DOCUMENTS

| JP | 2014-225846 A | 12/2014 |
| JP | 2015-34895 A | 2/2015 |
| JP | 2017-79408 A | 4/2017 |

(Continued)

OTHER PUBLICATIONS

Korean Office Action issued on Apr. 9, 2024, in counterpart Korean Patent Application No. 10-2022-0109332 (3 pages in English, 5 pages in Korean).

*Primary Examiner* — Nicholas G Giles
(74) *Attorney, Agent, or Firm* — NSIP Law

(57) ABSTRACT

An apparatus and a method of controlling a camera is provided. The apparatus includes a receiver configured to receive an image from an image sensor and a processor configured to detect a target object from the image, perform a first zoom adjustment operation of the camera including the image sensor based on whether the target object is changed and perform a second zoom adjustment of the camera based on a center point of the target object and a center point of the camera.

24 Claims, 13 Drawing Sheets

(56) References Cited

U.S. PATENT DOCUMENTS

2020/0280681 A1* 9/2020 Tsubusaki .............. H04N 23/69
2020/0329193 A1  10/2020 Selig et al.

FOREIGN PATENT DOCUMENTS

| KR | 10-2001-0041177 A | 5/2001 |
| KR | 10-2010-0129125 A | 12/2010 |
| KR | 10-2018-0027191 A | 3/2018 |
| KR | 10-2019-0014638 A | 2/2019 |

* cited by examiner

APPARATUS AND METHOD OF CONTROLLING CAMERA WITH AUTO-ZOOMING

CROSS-REFERENCE TO RELATED APPLICATIONS

This application claims the benefit under 35 USC § 119(a) of Korean Patent Application No. 10-2022-0109332, filed on Aug. 30, 2022, in the Korean Intellectual Property Office, the entire disclosure of which is incorporated herein by reference for all purposes.

BACKGROUND

1. Field

The following description relates to an apparatus and a method with camera control.

2. Description of Related Art

Typically, a relative movement of a target object may be used to perform auto zoom operations. In the typical auto zoom technology, when an object moves, a zoom-out operation is performed, and when the object moves slowly or does not move, a zoom-in operation is performed.

Typically, when performing an auto zoom operation for a certain object, the auto zoom operation was performed in such a manner that a user selects one or more objects through an interface such as by touching an object or by drawing a circle around the object, and then tracking the corresponding object.

However, the typical auto zoom method may not accurately reflect a user's intention because a fine zoom adjustment is impossible. Additionally, the touching of the user interface of the camera by a user to set a target object may cause shaking during an image capture operation, thereby lowering the quality of an image capturing result.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an apparatus includes a processor configured to: detect a target object from an image received from an image sensor of a camera; control a first zoom adjustment of the camera based on a determination that the target object is changed; and control a second zoom adjustment of the camera based on a location of a center point of the target object and a location of a center point of the camera.

The processor may be further configured to control a capture of a new image with the controlled second zoom adjustment, and the apparatus may be the camera and further comprises the image sensor connected to the processor, or the apparatus may be a portable or personal computer that comprises the camera that includes the image sensor connected to the processor.

The processor may be further configured to detect the center point of the camera; determine whether the center point of the camera coincides with center points of one or more objects comprised in the received image; and detect an object among the one or more objects whose center point coincides with the center point of the camera as the target object.

The processor may be further configured to determine whether the target object is changed; and perform the first zoom adjustment operation on a changed target object based on a determination that the target object is changed.

The processor may be further configured to perform a zoom-in operation on the changed target object based on a size of the changed target object and a size of an image captured by the camera.

The processor may be further configured to provide a user interface to perform the second zoom adjustment operation on the changed target object of the image based on the determination that the target object is changed.

The processor may be further configured to detect the center point of the camera; determine whether the center point of the camera is located inside a guideline of the target object; and perform the second zoom adjustment operation based on a result of determining whether the center point of the camera is located inside the guideline, and a distance between the center point of the camera and a region of interest (ROI) of the target object.

The processor may be further configured to perform the second zoom adjustment operation based on a determination that the distance between the center point of the camera and the ROI is increased or decreased when the center point of the camera is located inside the guideline.

The processor may be further configured to perform a zoom-in operation on the ROI when the distance between the center point of the camera and the ROI decreases; and perform a zoom-out operation on the ROI when the distance between the center point of the camera and the ROI increases.

The processor may be further configured to determine whether the center point of the camera is located at a center point of an object different from the target object when the center point of the camera is located outside the guideline; and change the target object based on a result of determining whether the center point of the camera is located at the center point of the different object or initialize a zoom adjustment operation.

The processor may be further configured to when the center point of the camera is not located at the center point of the different object: determine whether the target object exists inside a screen captured by the camera; and perform zoom initialization based on a result of determining whether the target object exists inside the screen.

In a general aspect a processor-implemented method includes detecting a target object from an image captured by an image sensor of a camera; performing a first zoom adjustment control of the camera based on a determination that the target object is changed; and performing a second zoom adjustment control of the camera based on a location of a center point of the target object and a location of a center point of the camera.

The detecting of the target object may include detecting the center point of the camera; determining whether the center point of the camera coincides with center points of one or more objects comprised in the received image; and detecting an object among the one or more objects whose center point coincides with the center point of the camera as the target object.

The performing of the first zoom adjustment may include determining whether the target object is changed; and performing the first zoom adjustment operation on a changed target object based on a determination that the target object is changed.

The performing of the first zoom adjustment operation on the changed target object may include performing a zoom-in operation on the changed target object based on a size of the changed target object and a size of the image captured by the camera.

The performing of the first zoom adjustment may further include providing a user interface to perform the second zoom adjustment operation on the changed target object of the image based on the determination that the target object is changed.

The performing of the second zoom adjustment may include detecting the center point of the camera; determining whether the center point of the camera is located inside a guideline of the target object; and performing the second zoom adjustment operation based on a result of determining whether the center point of the camera is located inside the guideline and a distance between the center point of the camera and a region of interest (ROI) of the target object.

The performing of the second zoom adjustment operation based on the distance between the center point of the camera and the ROI may include performing the second zoom adjustment operation based on a determination that the distance between the center point of the camera and the ROI is increased or decreased when the center point of the camera is located inside the guideline.

The performing of the second zoom adjustment operation based on the distance between the center point of the camera and the ROI may include performing a zoom-in operation on the ROI when the distance between the center point of the camera and the ROI decreases; and performing a zoom-out operation on the ROI when the distance between the center point of the camera and the ROI increases.

The performing of the second zoom adjustment operation based on the distance between the center point of the camera and the ROI may include determining whether the center point of the camera is located at a center point of an object different from the target object when the center point of the camera is located outside the guideline; and changing the target object based on a result of determining whether the center point of the camera is located at the center point of the different object or initializing a zoom adjustment operation.

The initializing of the zoom adjustment operation may include when the center point of the camera is not located at the center point of the different object: determining whether the target object exists inside a screen captured by the camera; and performing zoom initialization based a result of determining whether the target object exists inside the screen.

In a general aspect, a processor-implemented method includes detecting one or more objects in a received image; detecting a center point of a camera based on a movement of the camera; detecting an object, among the one or more objects, whose center point coincides with the center point of the camera as a target object; detecting a region of interest (ROI) in the target image; and performing one of a zoom-in operation and a zoom-out operation based on an increase or a decrease of a distance between the center point of the camera and the ROI.

The method may include detecting an object among one or more objects in the received image, whose center point coincides with the center point of the camera, as the target object.

The method may further include performing a zoom-out operation when the distance between the center point of the camera and the ROI of the target object increases, and performing a zoom-in operation when the distance between the center point of the camera and the ROI of the target object decreases.

Other features and aspects will be apparent from the following detailed description, the drawings, and the claims.

Figure 1:
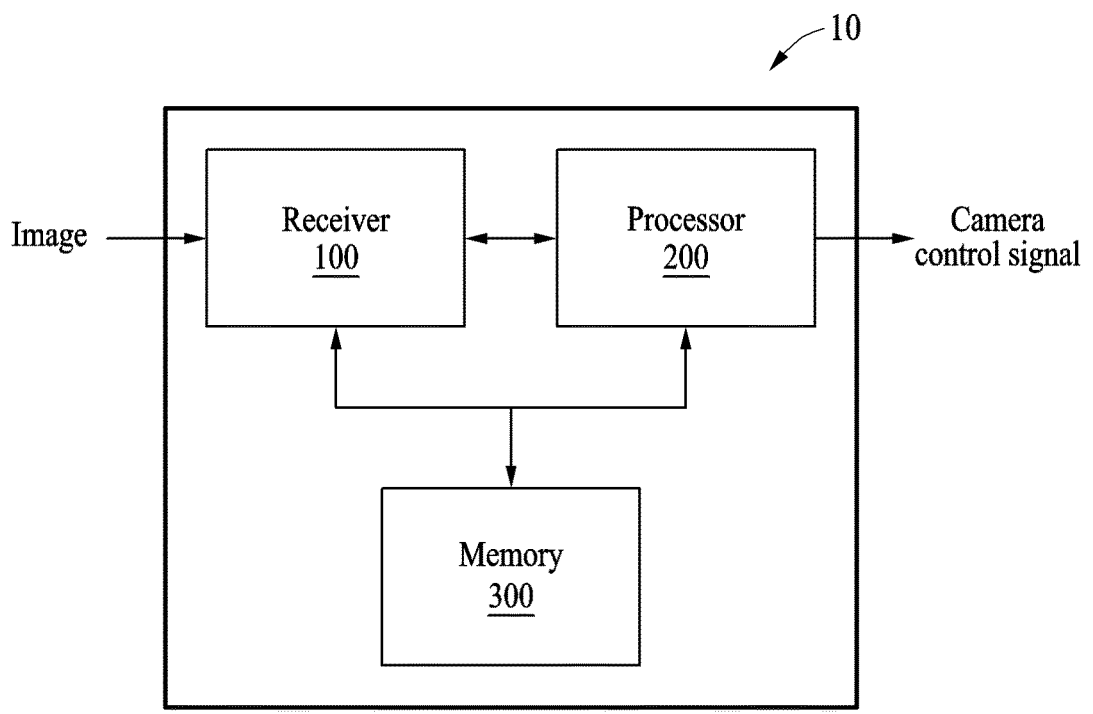
FIG. 1 illustrates an example computing apparatus, in accordance with one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

As used in connection with various example embodiments of the disclosure, any use of the terms "module" or "unit" means hardware and/or processing hardware configured to implement software and/or firmware to configure such processing hardware to perform corresponding operations. A "module" or "unit" may be hardware "logic," "logic block," "part," or "circuitry". As one non-limiting example, an application-predetermined integrated circuit (ASIC) may be referred to as an application-predetermined integrated module. As another non-limiting example, a field-programmable gate array (FPGA) or an application-specific integrated circuit (ASIC) may be respectively referred to as a field-programmable gate unit or an application-specific integrated unit. In a non-limiting example, such software may include components such as software components, object-oriented software components, class components, and may include processor task components, processes, functions, attributes, procedures, subroutines, segments of the software. Software may further include program code, drivers, firmware, microcode, circuits, data, database, data structures, tables, arrays, and variables. In another non-limiting example, such software may be executed by one or more central processing units (CPUs) of an electronic device or secure multimedia card.

A camera may typically have a lens assembly (e.g., of one or more lenses), an image sensor disposed with respect to the lens assembly to receive a focused image from the lens assembly, and movement hardware to move the lens(es) or lens assembly in axial or other directions, e.g., in directions perpendicular to the axial direction of the lens(es). As a non-limiting example, such movements can be implemented under control of circuit(ries) in, or connected to, the camera, that may provide various current, voltage, and/or other adjustments or signaling to components of the movement hardware. Such components of the movement hardware may typically be implemented through servos and/or electromagnetic (e.g., magnets) interactions, as non-limiting examples.

FIG. 1 illustrates an example computing apparatus, in accordance with one or more embodiments.

Referring to FIG. 1, a computing apparatus 10 may control a camera. The camera may refer to an apparatus that captures an image or a video. The image may include an image of an object that is formed by refraction or reflection of light and may refer to an image that represents a shape of an object using a line or a color. For example, the image may include information in a form to be processed by a computer. The video may be implemented as a set of images. The control by the computing apparatus 10 of the camera may be autonomously performed by a processor 200 of the computing apparatus 10, i.e., by autonomously performing zoom adjustment of the camera by the processor 200 after the image is captured by the image sensor, and performing fine zoom adjustment based (e.g., according to user selection of a user interface of the camera) without control of the focus or zoom of the camera by a user.

For example, the computing apparatus 10 may receive the image and perform a zoom adjustment operation based on the received image. The computing apparatus 10 may perform, as examples, zoom-in or zoom-out control operations. The computing apparatus 10 may perform a zoom adjustment control operation based only on a camera movement without a separate touch input from a user.

The zoom adjustment operation may mean arbitrarily adjusting a size of an object while the object to be captured and a camera are fixed at the same time. The zoom-in operation may refer to an operation of enlarging a scene or a size of an object captured by a camera, or an operation of approaching the scene or the object. The zoom-out operation may refer to an operation of reducing a scene or a size of an object captured by a camera or moving away from the scene or the object. For example, the control by the computing apparatus 10 may be performed by generating control signaling and provision of the control signaling to movement hardware of the camera to cause axial movement, for example, of the lens(es) in the camera that provide zoom implementations in the camera, e.g., which will enlarge the scene or the size of the object in the next image/frame captured by the camera in the zoom-in operation, or will reduce the scene or the size of the object in the next image/frame captured by the camera in the zoom-out operation. For example, the computing apparatus 10 may further include capturing such a next and/or further subsequent images/frames with the implemented zoom.

In a non-limiting example, the computing apparatus 10 may be implemented inside or outside a capturing device. For example, the computing apparatus 10 may be implemented inside a camera, while in an example the computing apparatus 10 is the camera. Additionally, the computing apparatus 10 may be implemented an electronic device, while in an example the computing apparatus 10 is the electronic device. The electronic device may be in a personal computer (PC), a data server, or a portable computer, as examples.

The portable computer may include, for example, a laptop computer, a mobile phone, a smartphone, a tablet PC, a mobile Internet device (MID), a personal digital assistant (PDA), an enterprise digital assistant (EDA), a digital still camera, a digital video camera, a portable multimedia player (PMP), a personal or portable navigation device (PND), a handheld game console, an e-book, a smart device, and the like. The smart device may include, for example, a smart watch, a smart band, and a smart ring.

As noted, the computing apparatus 10 may include the processor 200. The computing apparatus 10 may further include the memory 300 and/or the receiver 100.

The receiver 100 may receive an image from an image sensor. The image sensor may include an integrated circuit composed of a photoelectric conversion element. The receiver 100 may include a receiving interface. The receiver 100 may output the received image to the processor 200. In an example, the receiver 100 is also, or alternatively, representative of the lens(es), and movement hardware, and the image sensor.

The processor 200 may process data stored in the memory 300. The processor 200 may execute a computer-readable code (e.g., software) stored in the memory 300 and instructions triggered by the processor 200.

The processor 200 may be a hardware-implemented data processing device having a circuit that is physically structured to execute desired operations. The desired operations may include, for example, codes or instructions included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 200 may detect a target object from a received image.

The processor 200 may detect a center point of a camera. The processor 200 may determine whether the center point of the camera coincides with center points of one or more objects included in the image. The processor 200 may detect an object whose center point coincides with the center point of the camera among the one or more objects as the target object.

The processor 200 may perform a first zoom adjustment operation of a camera including an image sensor based on whether the target object is changed.

The processor 200 may determine whether the target object is changed. The processor 200 may perform the first zoom adjustment operation on the changed target object when the target object is changed.

The processor 200 may perform a zoom-in operation on the changed target object based on a size of the changed target object and a size of the image captured by the camera.

The processor 200 may provide a user interface for presets for a second zoom adjustment operation on the changed target object of the image when the target object is changed.

The processor 200 may perform the second zoom adjustment operation of the camera based on the center point of the target object and the center point of the camera. The processor 200 may detect the center point of the camera. The processor 200 may determine whether the center point of the camera is located inside a guideline of the target object. The processor 200 may perform the second zoom adjustment operation based on a result of determining whether the center point of the camera is located inside the guideline of the target object and a distance (or an interval) between the center point of the camera and a region of interest (ROI) of the target object. The ROI may be preset by a user. For example, the ROI may be a face of a person or an animal, as only examples.

When the center point of the camera is located inside the guideline of the target object, the processor 200 may perform the second zoom adjustment operation based on whether the distance between the center point of the camera and the ROI of the target object is increased or decreased.

When the distance between the center point of the camera and the ROI of the target object decreases, the processor 200 may perform a zoom-in operation on the ROI. When the distance between the center point of the camera and the ROI of the target object increases, the processor 200 may perform a zoom-out operation on the ROI.

When the center point of the camera is located outside the guideline of the target object, the processor 200 may determine whether the center point of the camera is located at a center point of an object different from the target object. The processor 200 may change the target object based on a result of determining whether the center point of the camera is located at the center point of an object different from the target object or may initialize a zoom adjustment.

When the center point of the camera is not located at the center point of the different object, the processor 200 may determine whether the target object exists inside a screen or image captured by the camera. The processor 200 may perform zoom initialization based on a result of determining whether the target object exists inside the screen or image captured by the camera.

The memory 300 may store data to control the camera. The memory 300 may store instructions (or programs) executable by the processor 200. For example, the instructions may include instructions for executing an operation of the processor and/or instructions for performing an operation of each component of the processor.

The memory 300 may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (M RAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device, or an insulator resistance change memory.

Figure 2:
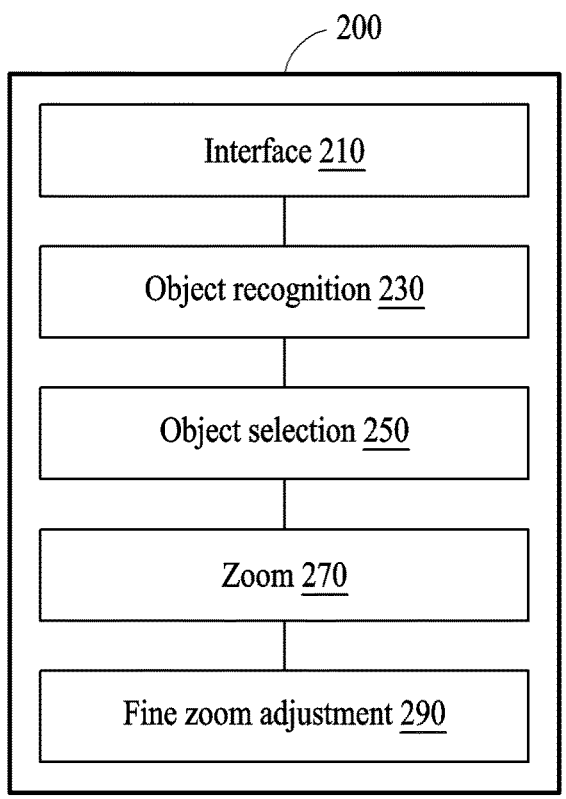
FIG. 2 illustrates an example configuration of a processor, in accordance with one or more embodiments.

FIG. 2 illustrates example operations of a processor, in accordance with one or more embodiments.

Referring to FIG. 2, a processor 200 may provide a user interface to perform a fine zoom adjustment on a certain object without a screen touch operation by a camera user.

The processor 200 may perform the zoom adjustment when the center point of the camera approaches or moves away from a point at which an enlargement of an object is desired. For example, the processor 200 may control the camera to take a full shot of the object when the center point of the camera approaches a point (e.g., a face of a person or an animal, as only examples) at which an enlargement of the object is desired.

The processor 200 may provide a user interface to perform a fine zoom adjustment when the center point of the camera approaches a point at which an enlargement of the object is desired. When a distance between a point (e.g., the ROI) at which an enlargement of the object is desired and the center point of the camera is less than or equal to a predetermined threshold distance, the processor 200 may provide a user interface to perform the fine zoom adjustment operation.

Through the above-described zoom adjustment operation, the processor 200 may conveniently perform the zoom adjustment in an image capturing environment in which it is difficult for a camera operator to use both hands. Additionally, the processor 200 may perform the zoom adjustment operation to reflect the intention of a photographer by automatically performing the zoom adjustment operation according to the movement of the center point of the camera.

In an example of capturing a person, when a camera user captures a close-up shot in which only an upper body of a subject is captured rather than a full shot in which a whole body of a subject is captured, the processor 200 may capture a natural close-up shot by moving a center of a screen in a direction of a face of a person.

Referring to FIG. 2, the processor 200 may include a hardware interface 210 (e.g., an I/O) to obtain and/or receive an image, and may perform an object recognition operation 230, an object selection operation 250, a zoom operation 270, and a fine zoom adjustment operation 290.

The interface 210 may receive an image from a receiver (e.g., the receiver 100 of FIG. 1). Alternatively, the interface 210 may obtain and/or receive an image from an image sensor or a memory. According to an example, the interface 210 may be implemented inside the receiver 100.

The object recognition operation 230 may recognize an object included in an image. The object recognition operation 230 may detect magnifiable objects, obtain a center point of the detected objects, and display the center point.

In an example, the object recognition operation 230 may also include displaying the center point of all objects among the objects of the received image, or displaying only the center point of the object close to the center point of the camera.

The object selection operation 250 will be described in detail with reference to FIG. 3. The zoom operation 270 will be described in detail with reference to FIG. 4. The fine zoom adjustment operation 290 will be described in detail with reference to FIG. 5.

In operations of the processor 200, the processor 200 may be representative of one or more processors. For example, each operation of the processor 200 may be performed by one or more processors, any combination(s) of two or more operations of the processor 200 may be performed by respectively performed by one or more processors, and all operations of processor 200 may be performed by one or more processors. Each of such one or more processors may be co-located, e.g., in a same computer, server, or server system, and/or may be performed by respective portions or complete operations of the processor 200 may be distributed over network-coupled computer systems so that the instructions and software and any associated data, data files, and data structures are stored, accessed, and executed in a distributed fashion. The processor 200 of FIG. 2 may be the processor 200 of FIG. 1.

Figure 3:
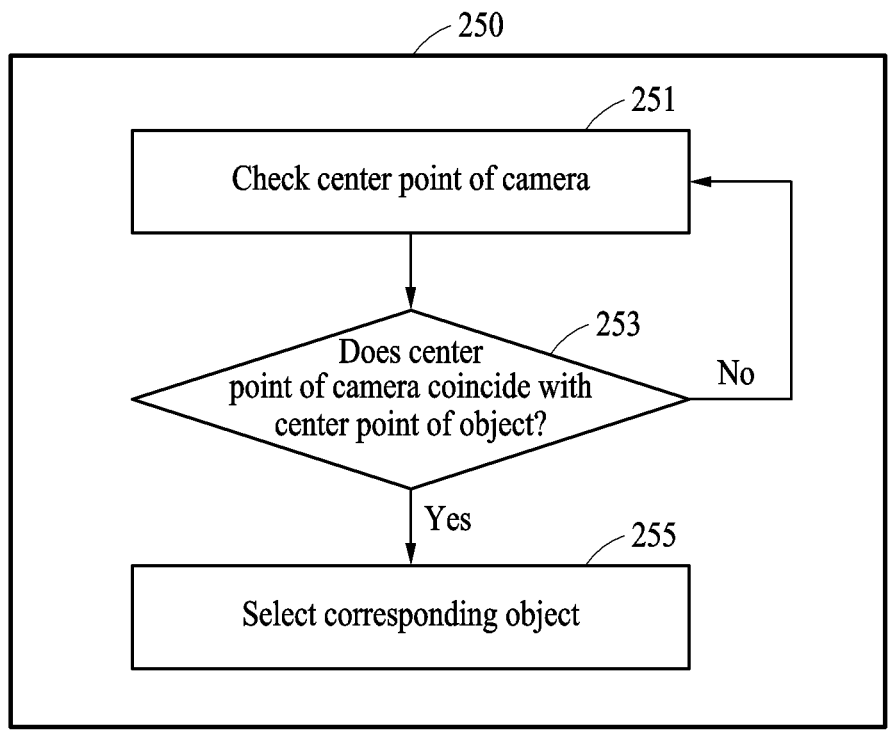
FIG. 3 illustrates an example object selection operation, in accordance with one or more embodiments.

The object selection operation of FIG. 3 may be performed by the processor 200 of FIG. 3.

Referring to FIG. 3, the object selection operation 250 may select an object (e.g., a target object) on which a zoom operation is to be performed. The object selection operation 250 may select an object in which a center point of the object coincides with a center point of the camera as the target object.

In operation 251, the object selection operation 250 may check the center point of the camera. In operation 253, the object selection operation 250 may determine whether the center point of the camera coincides with the center point or points of one or more objects included in the image.

The object selection operation 250 may detect an object whose center point coincides with the center point of the camera among the one or more objects as the target object. In operation 255, when the center point of the camera coincides with the center point of the detected object, the object selection operation 250 may select the corresponding object as the target object. For example, the object selection operation 250 may detect an object in which a distance between the center point of the object and the center point of the camera is less than or equal to a predetermined distance as the target object.

In operation 251, when the center point of the object does not coincide with the center point of the camera, the object selection operation 250 may check the center point of the camera again.

The object selection operation 250 may allow a user to select an object to be enlarged. At this time, when the center point of the object coincides with the + displayed at the center point of the camera, the object selection operation 250 may allow the object to be selected. The displaying of the center point of the camera with a "+" is only an example, and the center point of the camera may be displayed as a shape or symbol other than "+".

Figure 4:
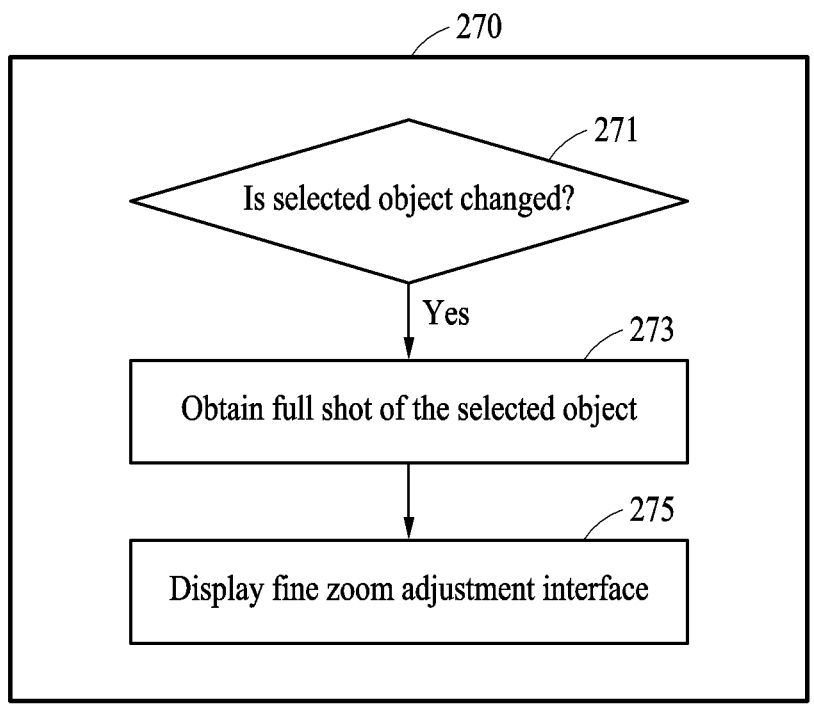
FIG. 4 illustrates an example zoom operation, in accordance with one or more embodiments.

FIG. 4 illustrates an example zoom operation 270, in accordance with one or more embodiments. The sub-operations of the zoom operation of FIG. 4 may be performed in the sequence and manner as shown. The operation portions of FIG. 4 may be performed by the processor 200 of FIG. 2.

Referring to FIG. 4, the zoom operation 270 may perform a first zoom adjustment operation of a camera including an image sensor based on whether a target object is changed.

The zoom operation 270 may determine whether the target object is changed. When the target object is changed, the zoom operation 270 may perform the first zoom adjustment operation on the changed target object.

The zoom operation 270 may perform the first zoom adjustment operation when an event in which the target object selected by the object selection operation 250 is changed occurs. In operation 271, the zoom operation 270 may determine whether the target object is changed. In operation 273, when the target object is changed, the zoom operation 270 may perform a zoom adjustment so that the changed target object becomes a full shot. In operation 275, the zoom operation 270 may provide a user interface to perform a fine zoom adjustment operation.

The zoom operation 270 may perform a zoom adjustment operation so that the selected object becomes a full shot. The user interface for a fine zoom adjustment operation may be expressed as a guideline interface in the form of a line connecting the center point of the object and the ROI (or interest point) of the object. When the object is a person or an animal, as only examples, the ROI may be a face.

When a zoom-out operation is performed, the user interface may be expressed as a guideline interface in the form of a line connecting the center point of the object and other points of the object.

Figure 5:
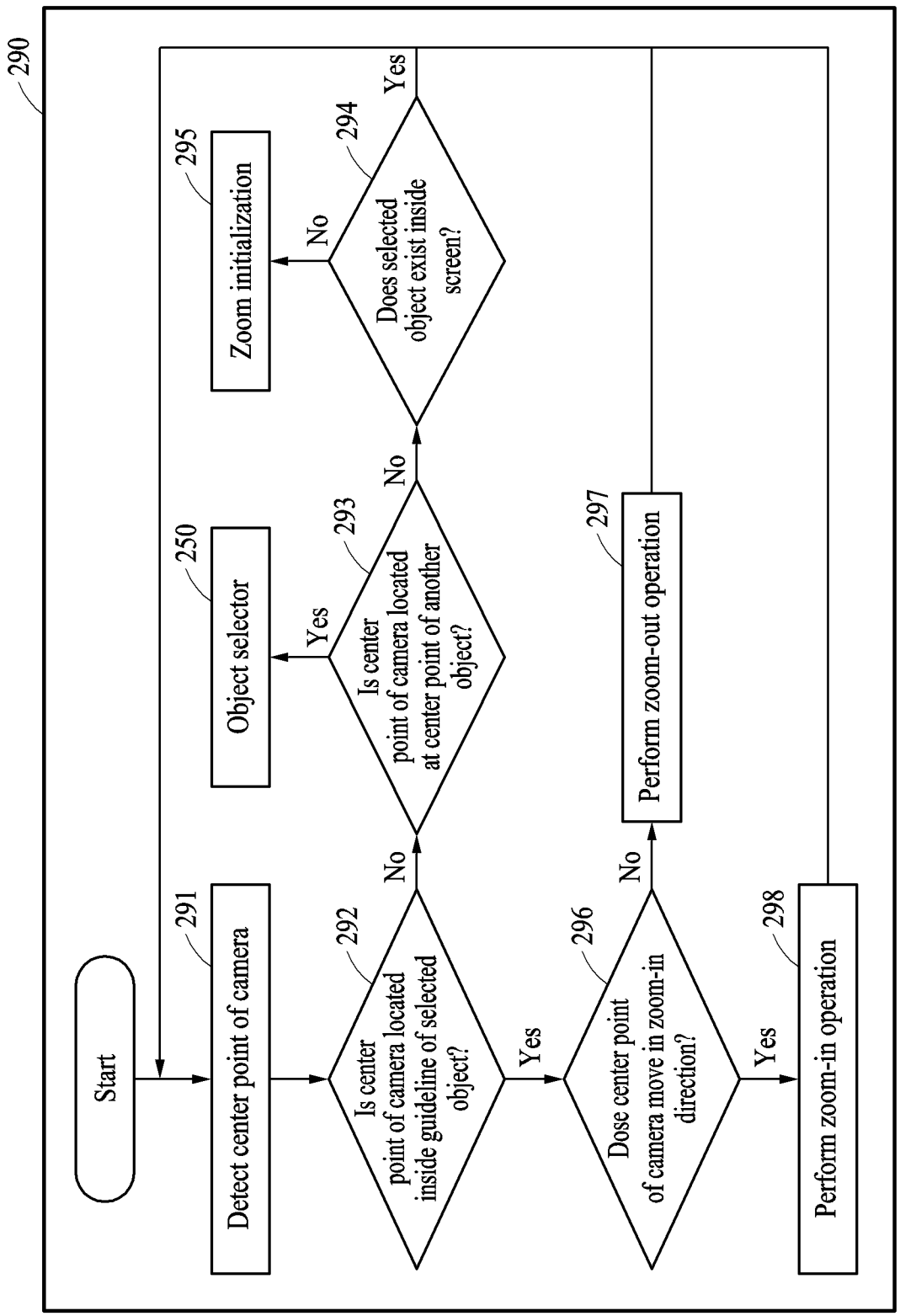
FIG. 5 illustrates an example fine zoom adjustment operation, in accordance with one or more embodiments.

FIG. 5 illustrates an example fine zoom adjustment operation 290, in accordance with one or more embodiments. The sub-operations of the fine zoom adjustment operation of FIG. 5 may be performed in the sequence and manner as shown. The zoom adjustment operation of FIG. 5 may be performed by the processor 200 of FIG. 2.

Referring to FIG. 5, the fine zoom adjustment operation 290 may perform an additional zoom operation (e.g., the second zoom adjustment) based on a camera movement of a user and a center point of a camera through a fine zoom adjustment interface.

The fine zoom adjustment operation 290 may perform a zoom-in operation when a user moves the center point of the camera in a zoom-in direction inside the guideline of the selected object, and may perform a zoom-out operation when a user moves the center point of the camera in a direction other than the zoom-in direction.

When the center point of a user camera moves out of the guideline of the selected object (e.g., the target object), the fine zoom adjustment operation 290 may return to the objection selection operation when the center point of the camera is at the center point of another object.

When the center point exists in an area other than the center of an object (such as a background) and not in the center point of another object, the fine zoom adjustment operation 290 may maintain the current zoom state when the target object is inside the screen and may initialize the zoom state when the target object disappears from the screen.

The fine zoom adjustment operation 290 may perform the second zoom adjustment operation of the camera based on the center point of the target object and the center point of the camera. In operation 291, the fine zoom adjustment operation 290 may detect the center point of the camera. In operation 292, the fine zoom adjustment operation 290 may determine whether the center point of the camera is located inside the guideline of the target object. The fine zoom adjustment operation 290 may perform the second zoom adjustment operation based on a result of determining whether the center point of the camera is located inside the guideline and a distance between the center point of the camera and the ROI of the target object.

When the center point of the camera is located inside the guideline, the fine zoom adjustment operation 290 may perform the second zoom adjustment operation based on whether the distance between the center point of the camera and the ROI of the target object is increased or decreased.

In operation 293, when the center point of the camera is located outside the guideline, the fine zoom adjustment operation 290 may determine whether the center point of the camera is located at a center point of an object different from the target object. The fine zoom adjustment operation 290 may change the target object based on a result of determining whether the center point of the camera is located at the center point of the object different from the target object, and may initialize the zoom adjustment operation.

When the center point of the camera is located at the center point of another object, the fine zoom adjustment operation 290 may perform the object selection operation 250 again.

In operation 294, when the center point of the camera is not located at the center point of another object, the fine zoom adjustment operation 290 may determine whether the target object exists inside the screen. In operation 291, when the target object exists inside the screen, the fine zoom adjustment operation 290 may check the center point of the camera. In operation 295, when the target object does not exist inside the screen, the fine zoom adjustment operation 290 may perform zoom initialization.

When the distance decreases, the fine zoom adjustment operation 290 may perform a zoom-in operation on the ROI. When the distance increases, the fine zoom adjustment operation 290 may perform a zoom-out operation on the ROI.

In operation 296, when the center point of the camera is located inside the guideline of the target object, the fine zoom adjustment operation 290 may determine whether the center point of the camera moves in a zoom-in direction. For example, the zoom-in direction may be a direction toward the ROI.

In operation 297, when the center point of the camera does not move in the zoom-in direction, the fine zoom adjustment operation 290 may perform a zoom-out operation.

In operation 298, when the center point of the camera moves in the zoom-in direction, the fine zoom adjustment operation 290 may perform a zoom-in operation.

Figure 6:
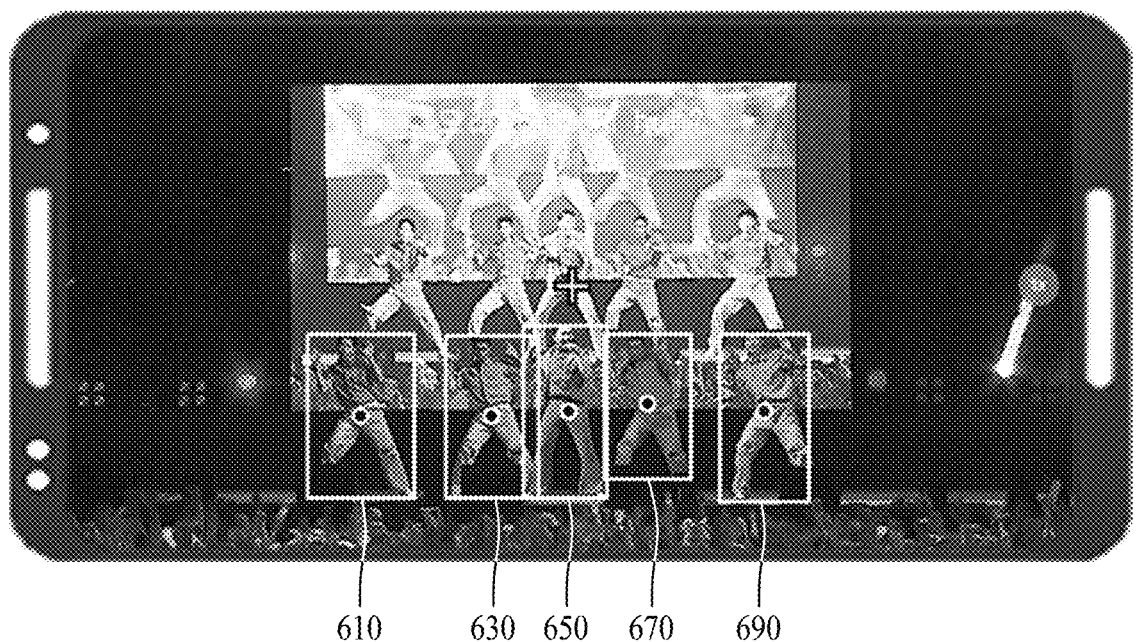
FIG. 6 illustrates an example object recognition operation, in accordance with one or more embodiments.

FIG. 6 illustrates an example object recognition operation, in accordance with one or more embodiments. The object recognition operation of FIG. 6 may be performed by the processor 200 FIG. 2.

Referring to FIG. 6, an object recognition operation (e.g., the object recognition operation 230 of FIG. 2) may recognize objects 610 to 690 included in an image. The object recognition operation 230 may detect magnifiable objects 610 to 690, obtain a center point of the detected objects 610 to 690, and display the center point.

Figure 7:
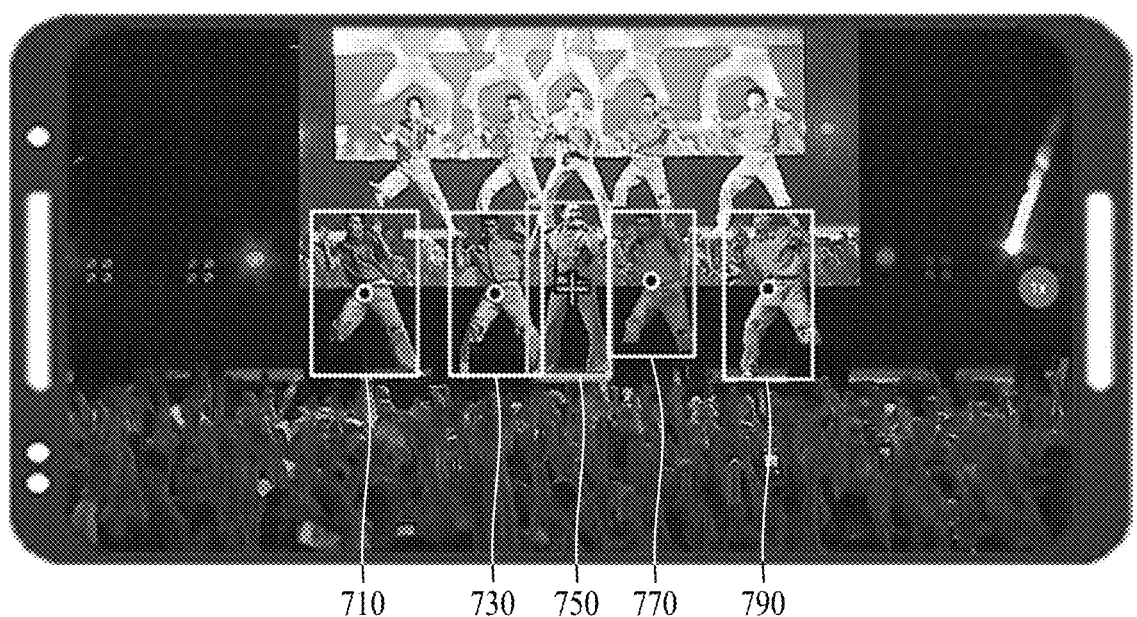
FIG. 7 illustrates an example objection selection operation, in accordance with one or more embodiments.

FIG. 7 illustrates an example object selection operation, in accordance with one or more embodiments. The object selection operation of FIG. 7 may be performed by the processor 200 of FIG. 2.

Referring to FIG. 7, in operation 251 of FIG. 3, the object selection operation (e.g., the object selection operation 250 of FIG. 2) may determine the center point of the camera. The object selection operation 250 may determine whether the center point of the camera coincides with center points of one or more objects 710 to 790 included in an image.

The object selection operation 250 may detect an object whose center point coincides with the center point of the camera among the one or more objects 710 to 790 as the target object 750. When the center point of the camera coincides with the center point of the object, the object selection operation 250 may select the corresponding object as the target object 750.

Figure 8:
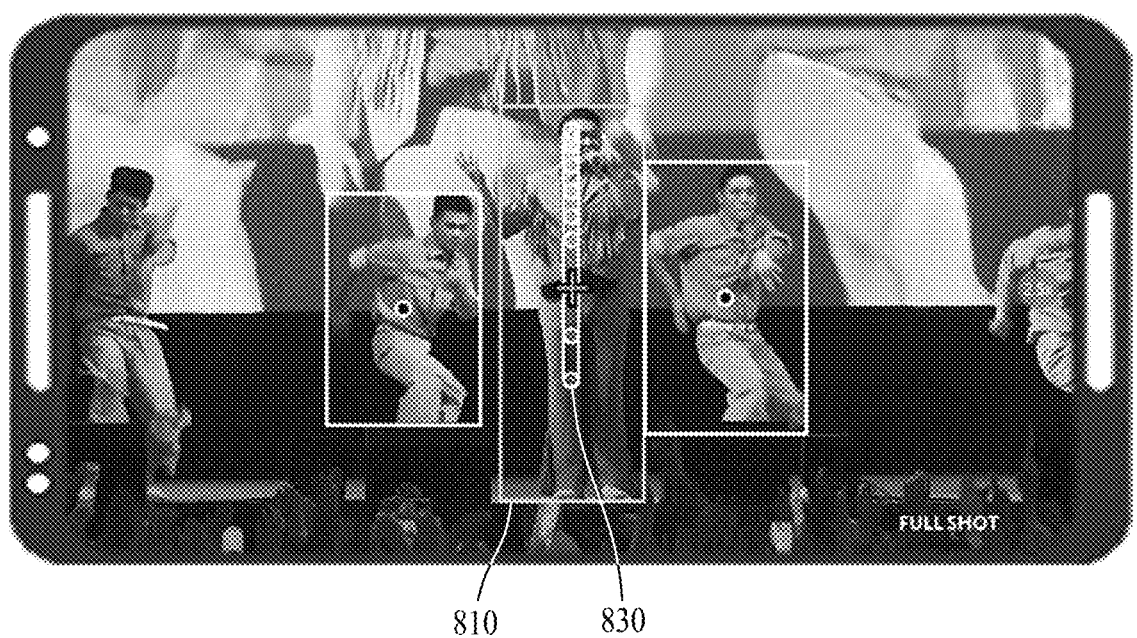
FIG. 8 illustrates an example zoom operation, in accordance with one or more embodiments.

FIG. 8 illustrates an example zoom operation, in accordance with one or more embodiment. The zoom operation of FIG. 8 may be performed by the processor 200 of FIG. 2.

Referring to FIG. 8, the processor 200 may determine whether the target object is changed. When the target object is changed, the processor 200 may perform a first zoom adjustment operation on a changed target object 810. The zoom operation 270 may provide a user interface 830 to perform a fine zoom adjustment operation. In the example of FIG. 8, the user interface 830 has a bar shape. However, the example is not limited thereto, and the user interface may have a spherical or polygonal shape according to an example.

The user interface may include a marker representing a degree of a zoom adjustment. In the example of FIG. 8, the marker may be expressed as a small circle. The closer to the ROI, the narrower the interval between the markers. In the example of FIG. 8, the closer to a face of the changed target object 830, the narrower the interval between the markers.

FIGS. 9A to 9D illustrate an example fine zoom adjustment operation, in accordance with one or more embodiments. The fine zoom adjustment operation of FIGS. 9A to 9D may be performed by the processor 200 of FIG. 2.

Referring to FIGS. 9A to 9D, when a center point 930 of a camera is located inside a guideline 910, the fine zoom adjustment operation (e.g., the fine zoom adjustment operation 290 of FIG. 2) may perform a second zoom adjustment based on whether a distance between the center point 930 of the camera and an ROI 950 (FIG. 9D) of a target object is increased or decreased.

Figure 9A:
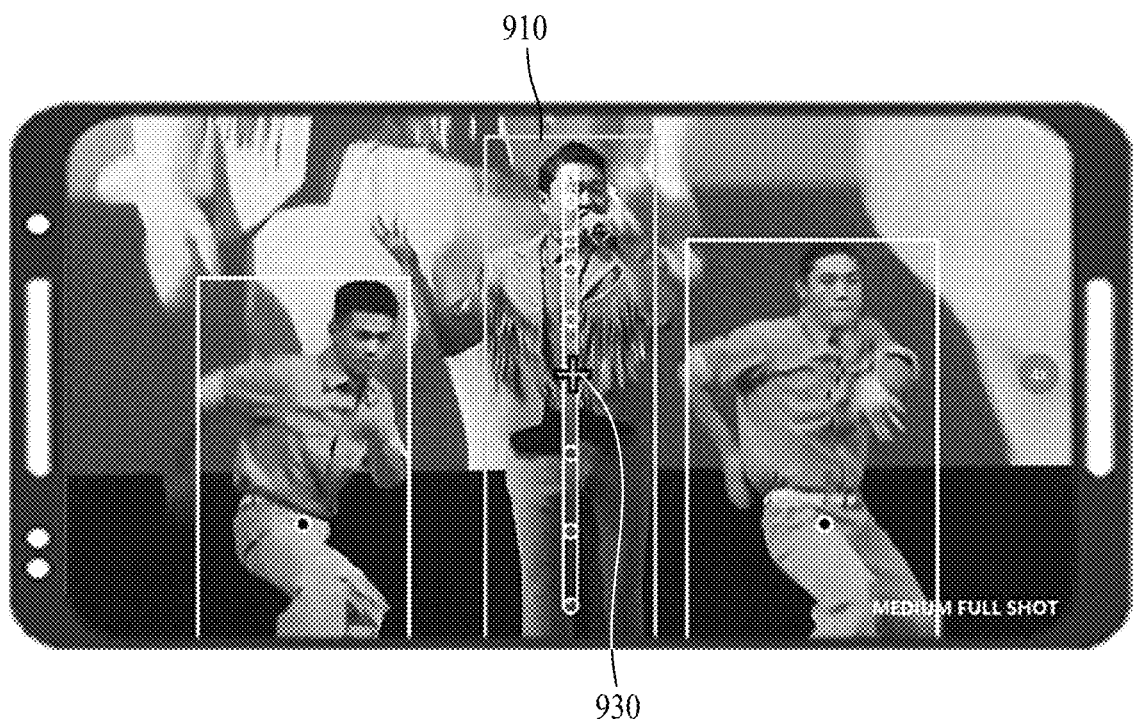
FIGS. 9A to 9D illustrate an example fine zoom adjustment operation, in accordance with one or more embodiments.

Referring to FIG. 9A, when the center point 930 of the camera is located inside the guideline 910 of the target object, the fine zoom adjustment operation 290 may determine whether the center point of the camera moves in a zoom-in direction.

Figure 9B:
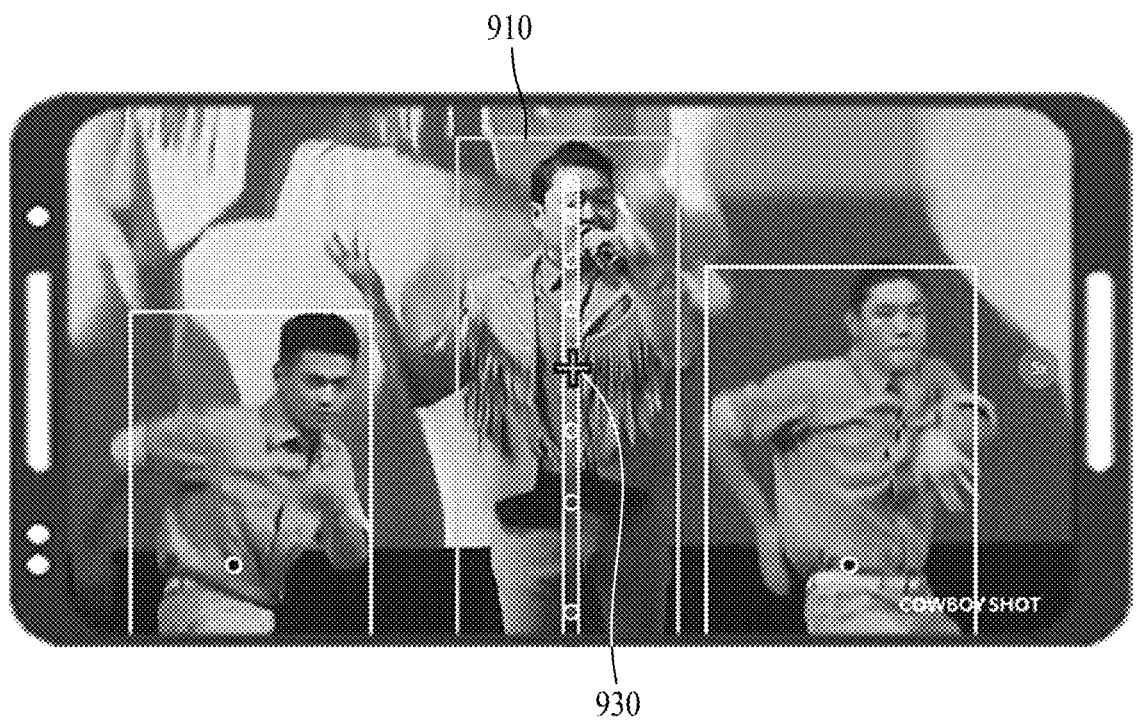

Referring to FIG. 9B, when a distance between the ROI (e.g., ROI 950 of FIG. 9D) and the center point of the camera decreases, the fine zoom adjustment operation 290 may perform a zoom-in operation on the ROI 950. The example of FIG. 9 may represent an example in which the ROI 950 is a face of the target object.

Figure 9C:
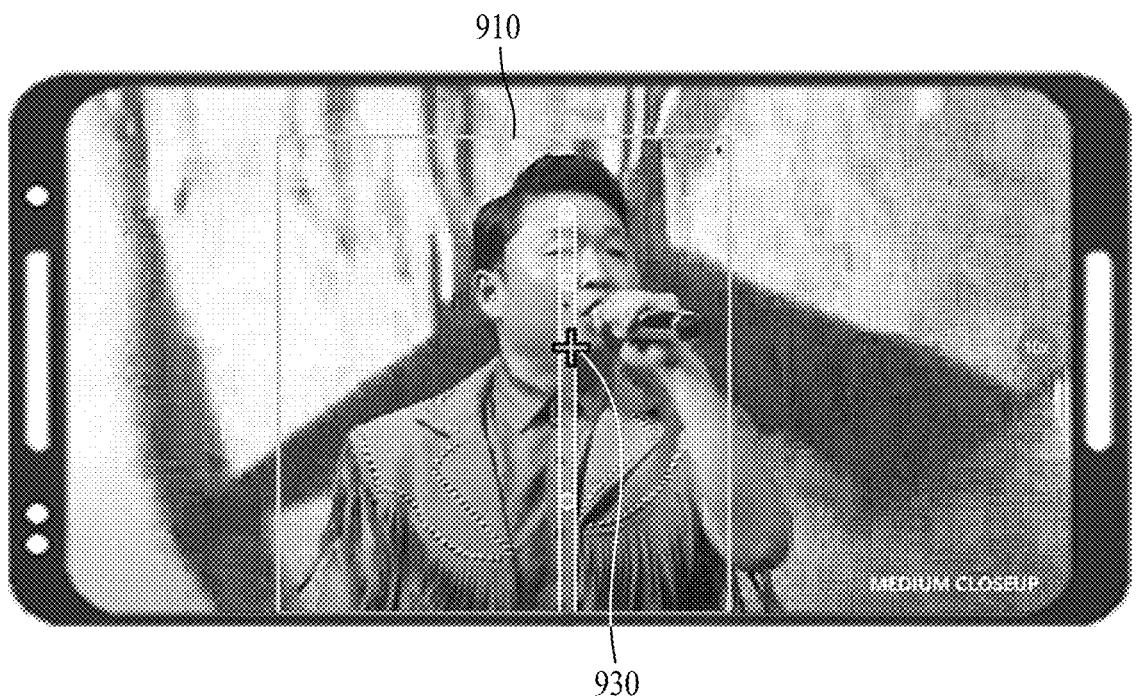
Figure 9D:
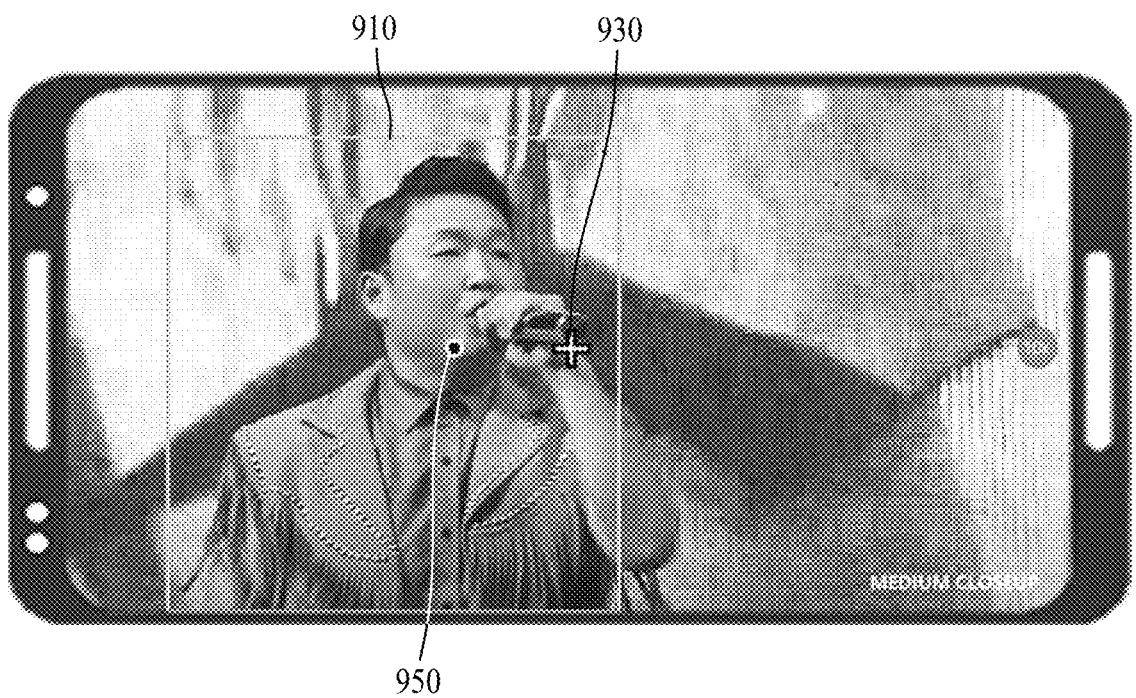
Figure 10A:
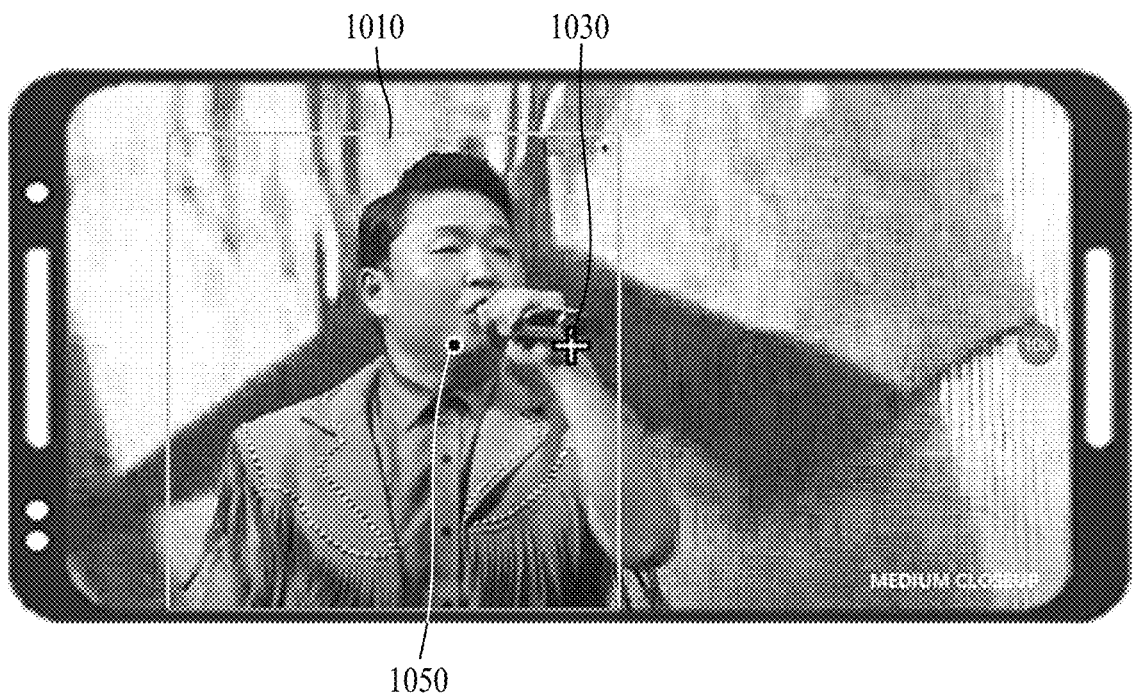
FIGS. 10A to 10F illustrate an example fine zoom adjustment operation, in accordance with one or more embodiments.
Figure 10B:
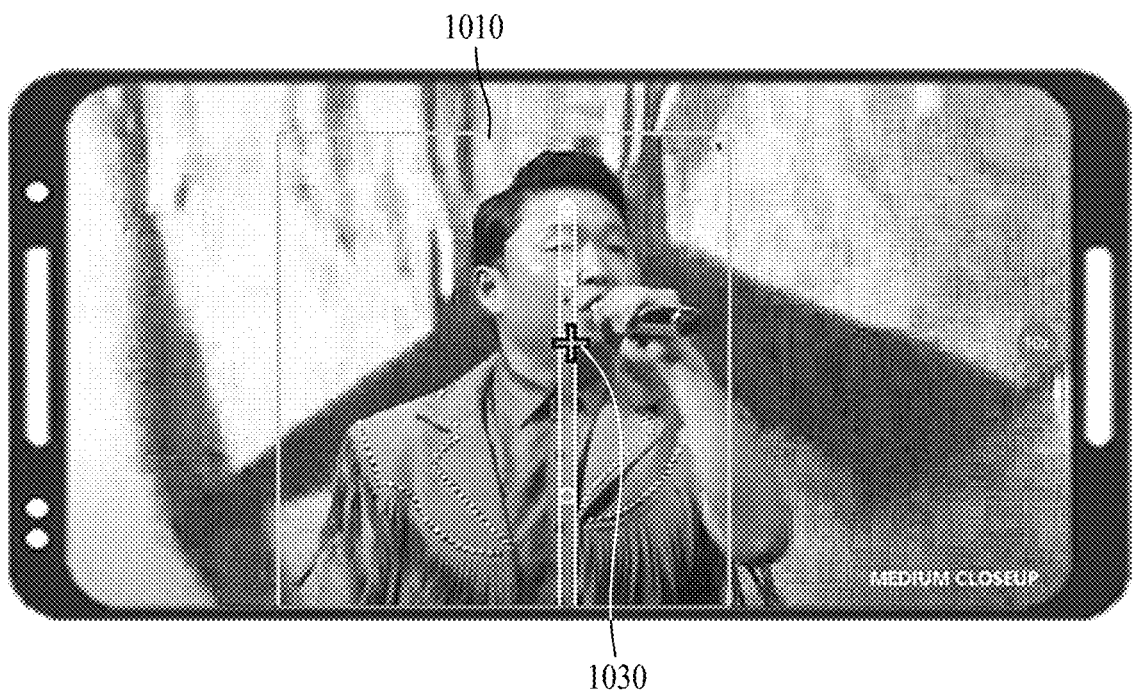
Figure 10C:
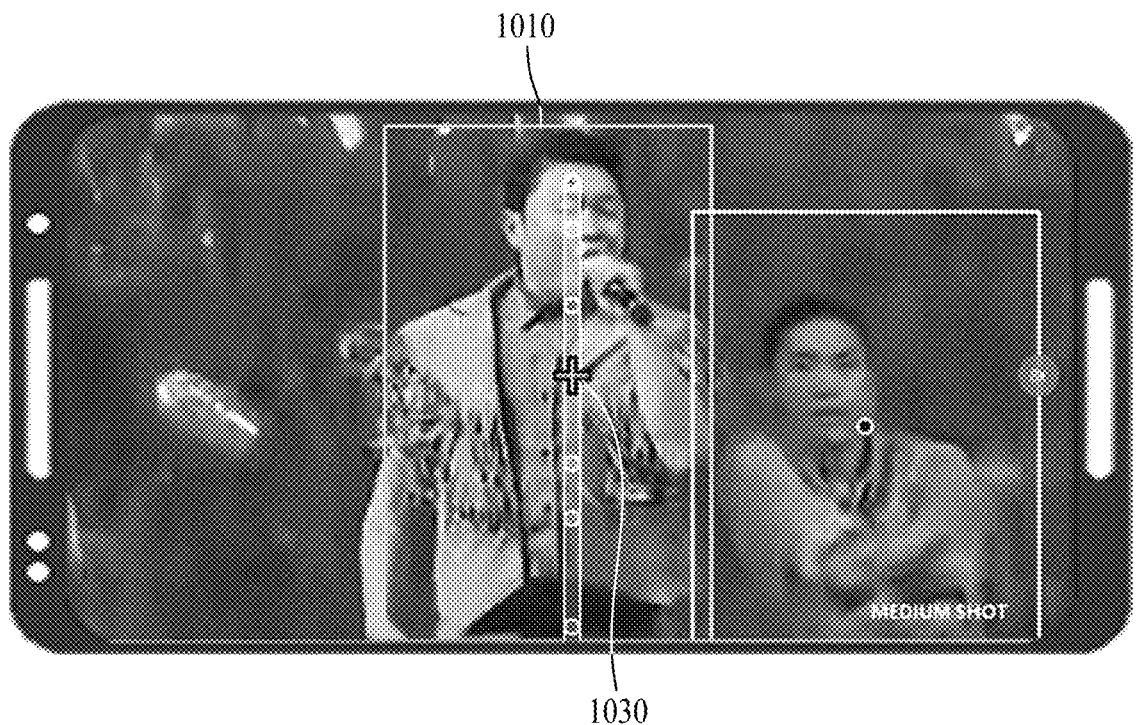
Figure 10D:
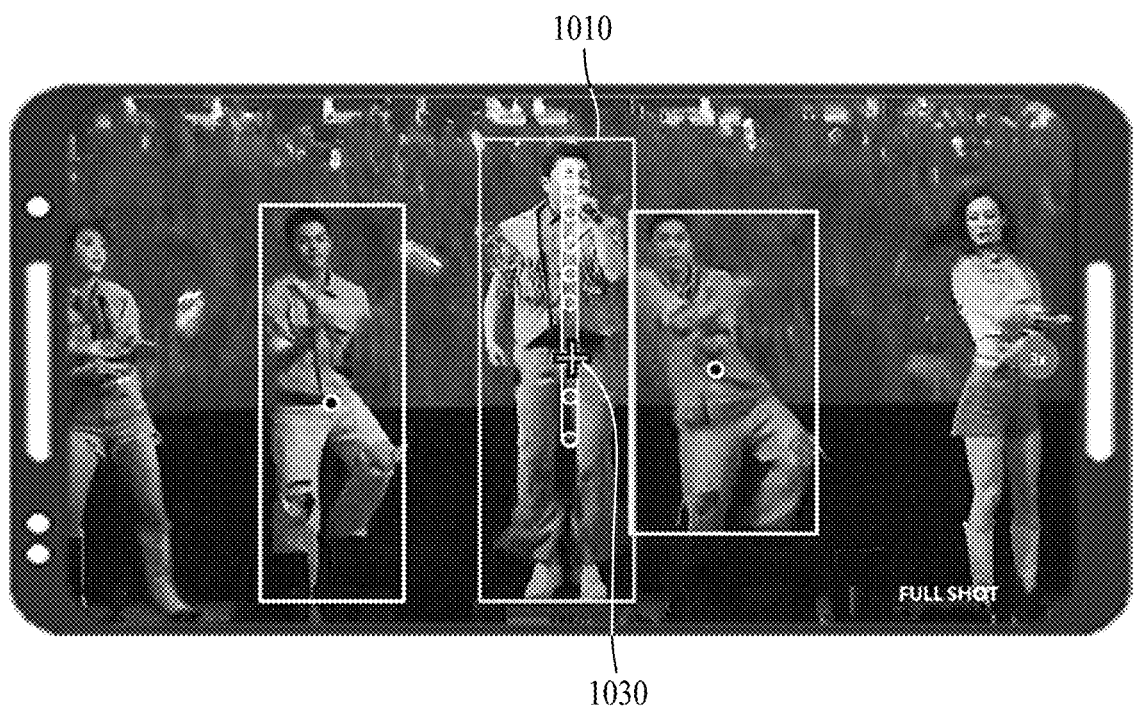
Figure 10E:
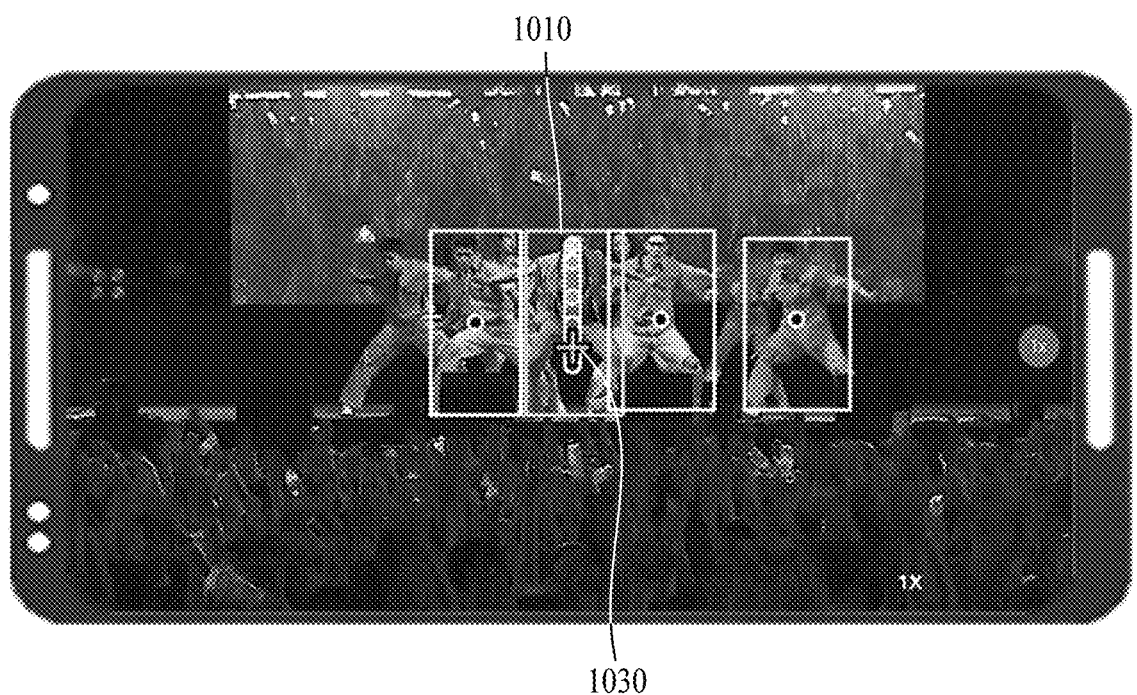
Figure 10F:
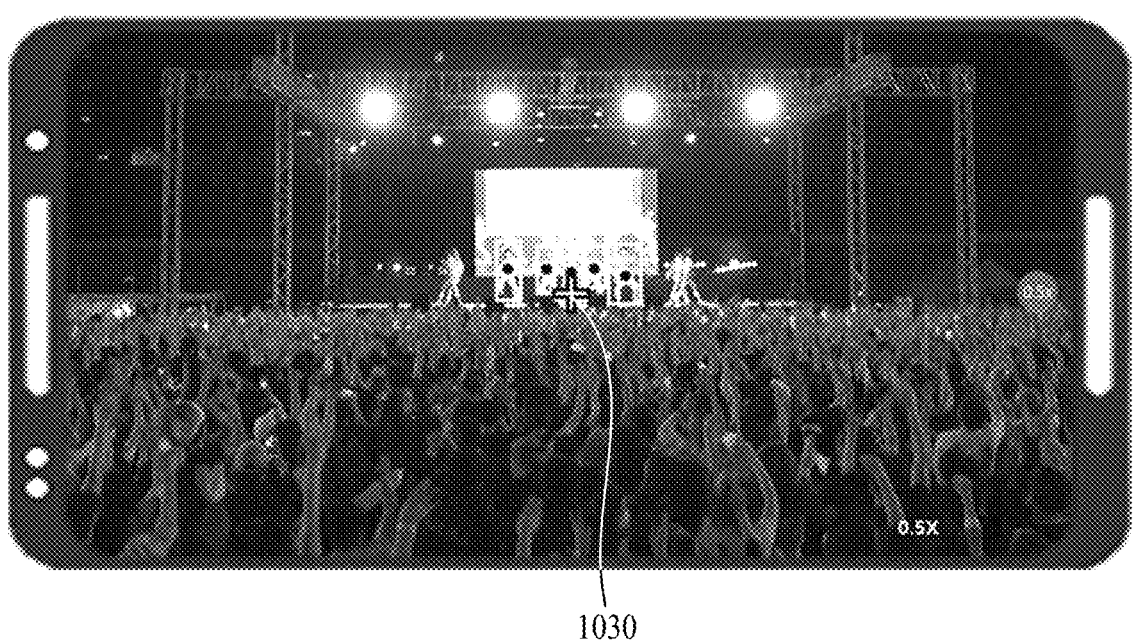
Figure 11A:
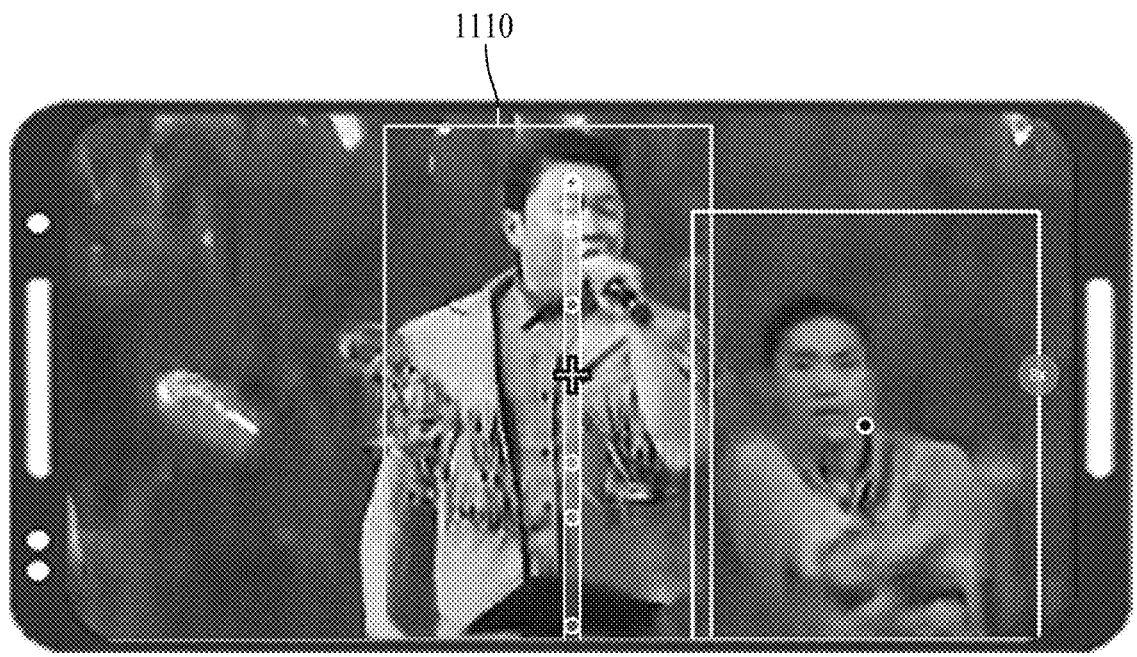
FIGS. 11A to 11D illustrate an example fine zoom adjustment operation, in accordance with one or more embodiments.
Figure 11B:
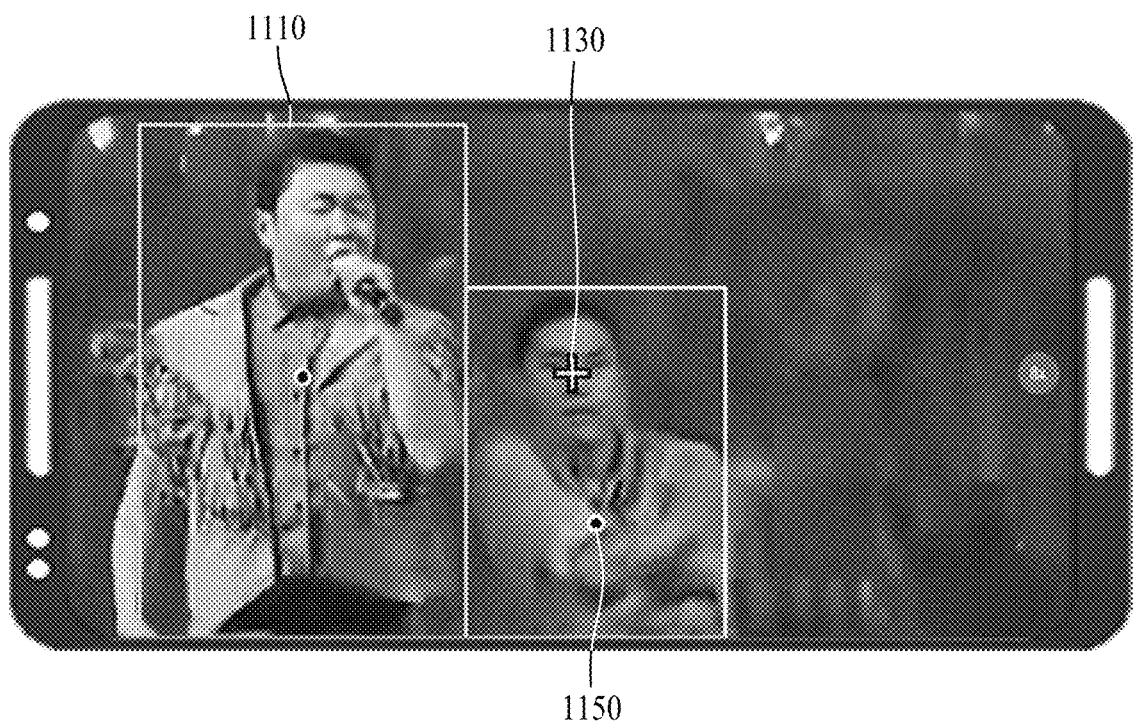
Figure 11C:
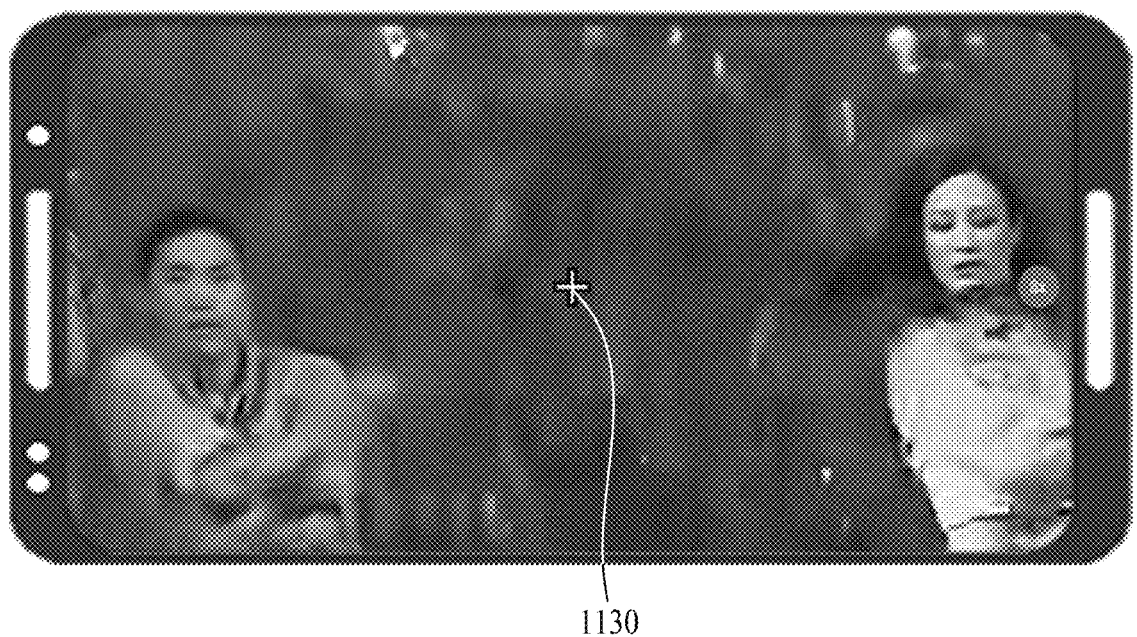
Figure 11D:
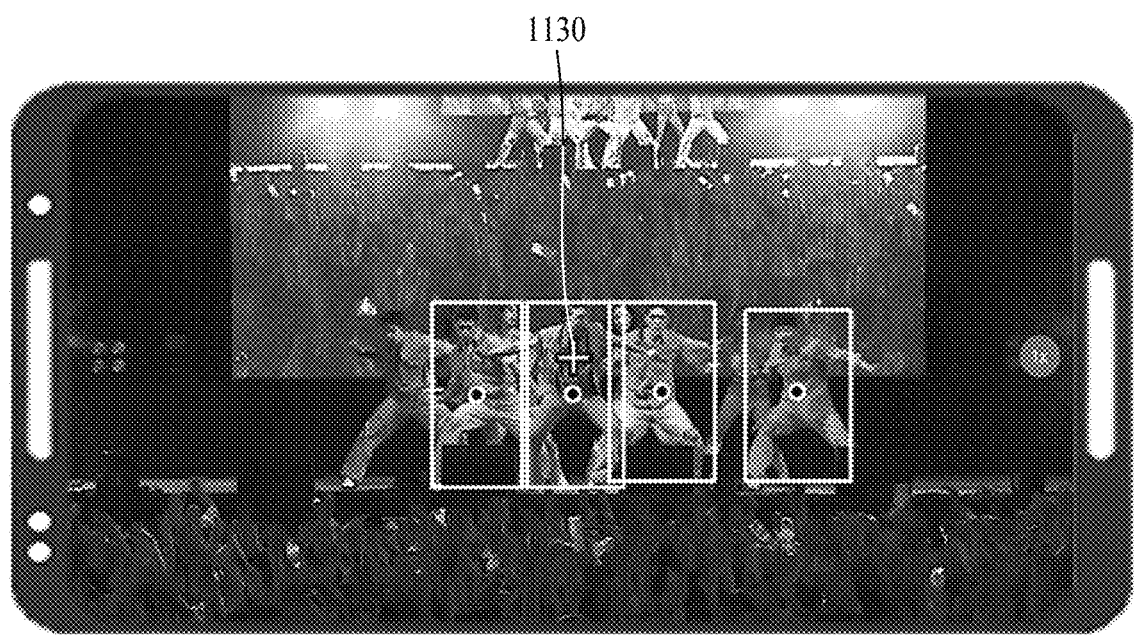

Referring to FIG. 9C, the fine zoom adjustment operation 290 may enhance a degree of the zoom-in operation on the ROI 950 of the target object as the center point 930 of the camera approaches the ROI 950.

The fine zoom adjustment operation 290 may perform finer zoom adjustment using the user interface (e.g., the user interface 830 of FIG. 8) to perform the fine zoom adjustment.

When a user moves the center point 930+ of the camera, located in the center of the object along the user interface, upward, (e.g., when the distance between the center point 930 of the camera and the ROI 950 of the target object decreases) the fine zoom adjustment operation 290 may perform a zoom-in operation.

When capturing an image of a person, the fine zoom adjustment operation 290 may help a zoom adjustment by displaying a shot size frequently used when capturing an image on a guideline. The fine zoom adjustment operation 290 may allow the zoom adjustment to be completed when the center point 930+ of the camera is out of the guideline.

At this time, the guideline may be continuously displayed or may be configured to disappear, leaving only a point. When the center point 930+ of the camera approaches the zoom point again, the guideline appears again, and when the center point 930+ moves downward along the guideline (e.g., when the distance between the center point 930 of the camera and the ROI 950 of the target object increases), the fine zoom adjustment operation 290 may perform a zoom-out operation.

When a zoom-out operation that may not be finely adjusted is performed, the operation of the fine zoom adjustment operation 290 may be completed. Additionally, when an object used for a zoom adjustment disappears from the screen, the zoom setting may be initialized.

FIGS. 10A to 10F illustrate an example fine zoom adjustment operation, in accordance with one or more embodiments. The fine zoom adjustment operation of FIGS. 10A to 10F may be performed by the processor 200 of FIG. 2.

Referring to FIGS. 10A to 10F, the fine zoom adjustment operation (e.g., the fine zoom adjustment operation 290 of FIG. 2) may detect a central point 1030 of a camera. The fine zoom adjustment operation 290 may determine whether the center point 1030 of the camera is located inside a guideline 1010 of a target object. The fine zoom adjustment operation 290 may perform a second zoom adjustment operation based on a result of determining whether the center point of the camera is located inside the guideline, and based on a distance between the center point 1030 of the camera and an ROI 1050 of the target object.

When the center point 1030 of the camera is located inside the guideline 1010, the fine zoom adjustment operation 290 may perform the second zoom adjustment based on whether a distance between the center point 1030 of the camera and the ROI 1050 is increased or decreased. The fine zoom adjustment operation 290 may perform a zoom-out operation when the distance increases.

In the example of FIGS. 10A to 10F, as the center point 1030 of the camera moves away from the ROI 1050, the fine zoom adjustment operation 290 may perform a zoom-out operation.

FIGS. 11A to 11D illustrate an example fine zoom adjustment operation, in accordance with one or more embodiments. The fine zoom adjustment operation of FIGS. 11A to 10D may be performed by the processor 200 of FIG. 2.

Referring to FIGS. 11A to 11D, when a central point 1130 of a camera is located outside a guideline 1110, the fine zoom adjustment operation (e.g., the fine zoom adjustment operation 290 of FIG. 2) may determine whether the center point 1130 of the camera is located at a center point 1150 of an object different from the target object (e.g., whether the center point 1130 of the camera coincides with center point 1150 of an object different from the target object). The fine zoom adjustment operation 290 may change the target object based on a result of determining that the center point of the camera is located at the center point 1150 of the object different from the target object or may initialize the zoom adjustment operation.

When the center point 1130 of the camera is located at the center point 1150 of another object that is different from the target object (e.g., when the center point 1130 of the camera coincides with center point 1150 of another object that is different from the target object), the fine zoom adjustment operation 290 may perform the object selection operation 250 again to select the other object.

When the center point 1130 of the camera is not located at the center point 1150 of another object (e.g., when the center point 1130 of the camera does not coincide with center point 1150 of another object), the fine zoom adjustment operation 290 may determine whether the target object exists inside the screen. When the target object exists inside the screen, the fine zoom adjustment operation 290 may check the center point 1130 of the camera. When the target object does not exist inside the screen, the fine zoom adjustment operation 290 may perform zoom initialization.

Figure 12:
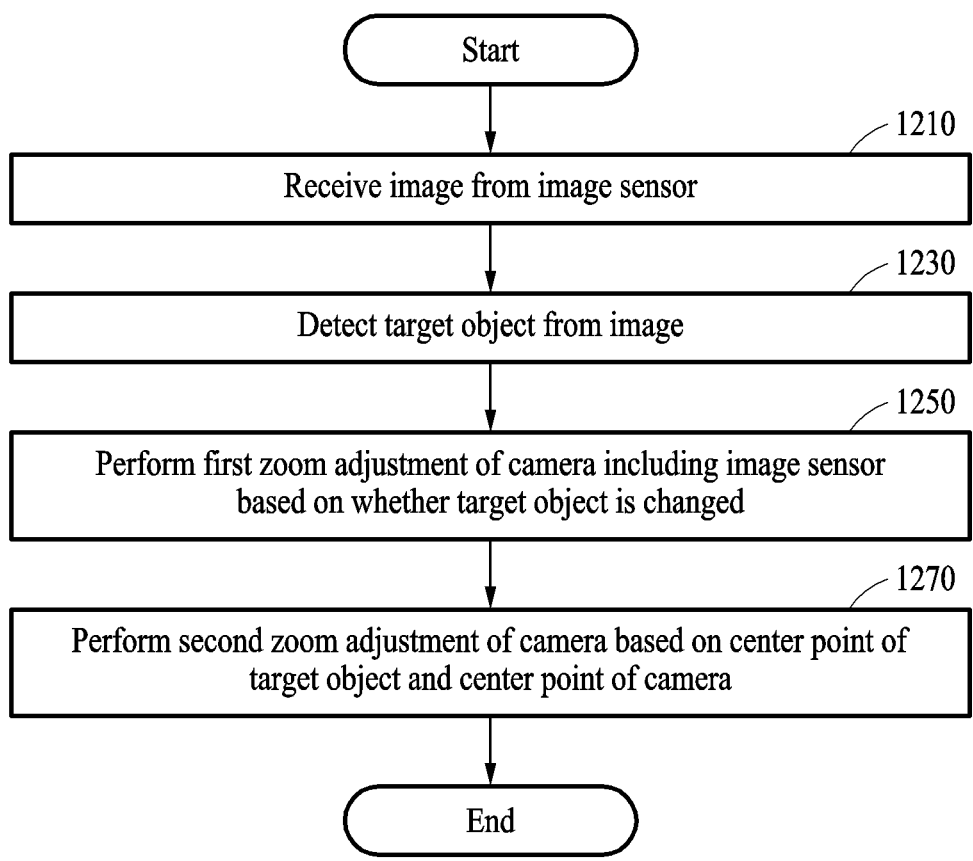
FIG. 12 illustrates an example method with camera control, in accordance with one or more embodiments.

FIG. 12 illustrates an example method with camera control, in accordance with one or more embodiments. The method may be performed by the computing apparatus of FIG. 1, e.g., where the computing apparatus is a camera or electronic device. The operations in FIG. 12 may be performed in the sequence and manner as shown. However, the order of some operations may be changed, or some of the operations may be omitted, without departing from the spirit and scope of the shown example. Additionally, operations illustrated in FIG. 12 may be performed in parallel or simultaneously. One or more blocks of FIG. 12, and combinations of the blocks, can be implemented by special purpose hardware-based computer that perform the specified functions, or combinations of special purpose hardware and instructions, e.g., computer or processor instructions. In addition to the description of FIG. 12 below, the descriptions of FIGS. 1-11 are also applicable to FIG. 12 and are incorporated herein by reference. Thus, the above description may not be repeated here for brevity purposes. The operations of FIG. 12 may be performed by a processor.

Referring to FIG. 12, in operation 1210, the receiver (e.g., the receiver 100 of FIG. 1) may receive an image from an image sensor.

In operation 1230, the processor (e.g., the processor 200 of FIG. 1) may detect a target object in the received image.

The processor 200 may detect a center point of a camera. The processor 200 may determine whether the center point of the camera coincides with center points of one or more objects included in the image. The processor 200 may detect an object whose center point coincides with the center point of the camera among the one or more objects as the target object.

In operation 1250, the processor 200 may perform a first zoom adjustment of the camera including the image sensor based on whether the target object is changed.

The processor 200 may determine whether the target object is changed. When the target object is changed, the processor 200 may perform the first zoom adjustment on the changed target object.

The processor 200 may perform a zoom-in operation on the changed target object based on a size of the changed target object and a size of an image captured by the camera.

In operation 1270, when the target object is changed, the processor 200 may provide a user interface to perform a second zoom adjustment on the changed target object of the image.

The processor 200 may perform the second zoom adjustment of the camera based on a relation between the center point of the target object and the center point of the camera. The processor 200 may detect the center point of the camera. The processor 200 may determine whether the center point of the camera is located inside the guideline of the target object. The processor 200 may perform the second zoom adjustment based on a result of determining that the center point of the camera is located inside the guideline and a distance between the center point of the camera and the ROI of the target object.

When the center point of the camera is located inside the guideline, the processor 200 may perform the second zoom adjustment based on whether a distance between the center point of the camera and the ROI of the target object is increased or decreased.

When the distance between the center point of the camera and the ROI of the target object decreases, the processor 200 may perform a zoom-in operation on the ROI. When the distance between the center point of the camera and the ROI of the target object increases, the processor 200 may perform a zoom-out operation on the ROI.

When the center point of the camera is located outside of the guideline, the processor 200 may determine whether the center point of the camera is located at a center point of an object different from the target object. The processor 200 may change the target object based on a result of determining whether the center point of the camera is located at the center point of the object different from the target object, or may initialize the zoom adjustment.

When the center point of the camera is not located at the center point of the different object, the processor 200 may determine whether the target object exists inside the screen captured by the camera. The processor 200 may perform zoom initialization based on a result of determining whether the target object exists inside the screen captured by the camera.

The computing apparatus 10, receiver 100, processor 200, memory 300, hardware interface 210, camera zoom hardware, and other devices, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-12, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus, comprising:
  a processor configured to:
    detect a first object as a target object from an image received from an image sensor of a camera;
    control a first zoom adjustment of the camera based on a determination that the target object is changed from the first object to a second object, including changing the target object from the first object to the second object based on a result of determining whether a center point of the camera is located at a center point of the second object; and
    control a second zoom adjustment of the camera based on a location of a center point of the target object and a location of the center point of the camera.

2. The apparatus of claim 1, wherein the processor is further configured to control a capture of a new image with the controlled second zoom adjustment, and
  wherein the apparatus is the camera and further comprises the image sensor connected to the processor, or
  wherein the apparatus is a portable or personal computer that comprises the camera that includes the image sensor connected to the processor.

3. The apparatus of claim 1, wherein the processor is further configured to:
  detect the center point of the camera;
  determine whether the center point of the camera coincides with center points of one or more objects comprised in the received image; and
  detect an object among the one or more objects whose center point coincides with the center point of the camera as the target object.

4. The apparatus of claim 1, wherein the processor is further configured to:
  determine whether the target object is changed; and
  perform the first zoom adjustment operation on a changed target object based on a determination that the target object is changed.

5. The apparatus of claim 4, wherein the processor is further configured to perform a zoom-in operation on the changed target object based on a size of the changed target object and a size of an image captured by the camera.

6. The apparatus of claim 4, wherein the processor is further configured to provide a user interface to perform the second zoom adjustment operation on the changed target object of the image based on the determination that the target object is changed.

7. The apparatus of claim 1, wherein the processor is further configured to:
- detect the center point of the camera;
- determine whether the center point of the camera is located inside a guideline of the target object; and
- perform the second zoom adjustment operation based on a result of determining whether the center point of the camera is located inside the guideline, and a distance between the center point of the camera and a region of interest (ROI) of the target object.

8. The apparatus of claim 7, wherein the processor is further configured to perform the second zoom adjustment operation based on a determination that the distance between the center point of the camera and the ROI is increased or decreased when the center point of the camera is located inside the guideline.

9. The apparatus of claim 7, wherein the processor is further configured to:
- perform a zoom-in operation on the ROI when the distance between the center point of the camera and the ROI decreases; and
- perform a zoom-out operation on the ROI when the distance between the center point of the camera and the ROI increases.

10. The apparatus of claim 7, wherein the processor is further configured to:
- determine whether the center point of the camera is located at a center point of an object different from the target object when the center point of the camera is located outside the guideline; and
- change the target object based on a result of determining whether the center point of the camera is located at the center point of the different object or initialize a zoom adjustment operation.

11. The apparatus of claim 10, wherein the processor is further configured to,
- when the center point of the camera is not located at the center point of the different object:
  - determine whether the target object exists inside a screen captured by the camera; and
  - perform zoom initialization based on a result of determining whether the target object exists inside the screen.

12. A processor-implemented method, comprising:
- detecting a first object as a target object from an image captured by an image sensor of a camera;
- performing a first zoom adjustment control of the camera based on a determination that the target object is changed from the first object to a second object, including changing the target object from the first object to the second object based on a result of determining whether a center point of the camera is located at a center point of the second object; and
- performing a second zoom adjustment control of the camera based on a location of a center point of the target object and a location of the center point of the camera.

13. The method of claim 12, wherein the detecting of the target object comprises:
- detecting the center point of the camera;
- determining whether the center point of the camera coincides with center points of one or more objects comprised in the received image; and
- detecting an object among the one or more objects whose center point coincides with the center point of the camera as the target object.

14. The method of claim 12, wherein the performing of the first zoom adjustment comprises:
- determining whether the target object is changed; and
- performing the first zoom adjustment operation on a changed target object based on a determination that the target object is changed.

15. The method of claim 14, wherein the performing of the first zoom adjustment operation on the changed target object comprises performing a zoom-in operation on the changed target object based on a size of the changed target object and a size of the image captured by the camera.

16. The method of claim 14, wherein the performing of the first zoom adjustment further comprises providing a user interface to perform the second zoom adjustment operation on the changed target object of the image based on the determination that the target object is changed.

17. The method of claim 12, wherein the performing of the second zoom adjustment comprises:
- detecting the center point of the camera;
- determining whether the center point of the camera is located inside a guideline of the target object; and
- performing the second zoom adjustment operation based on a result of determining whether the center point of the camera is located inside the guideline and a distance between the center point of the camera and a region of interest (ROI) of the target object.

18. The method of claim 17, wherein the performing of the second zoom adjustment operation based on the distance between the center point of the camera and the ROI comprises performing the second zoom adjustment operation based on a determination that the distance between the center point of the camera and the ROI is increased or decreased when the center point of the camera is located inside the guideline.

19. The method of claim 17, wherein the performing of the second zoom adjustment operation based on the distance between the center point of the camera and the ROI comprises:
- performing a zoom-in operation on the ROI when the distance between the center point of the camera and the ROI decreases; and
- performing a zoom-out operation on the ROI when the distance between the center point of the camera and the ROI increases.

20. The method of claim 17, wherein the performing of the second zoom adjustment operation based on the distance between the center point of the camera and the ROI comprises:
- determining whether the center point of the camera is located at a center point of an object different from the target object when the center point of the camera is located outside the guideline; and
- changing the target object based on a result of determining whether the center point of the camera is located at the center point of the different object or initializing a zoom adjustment operation.

21. The method of claim 20, wherein the initializing of the zoom adjustment operation comprises,
- when the center point of the camera is not located at the center point of the different object:
  - determining whether the target object exists inside a screen captured by the camera; and
  - performing zoom initialization based a result of determining whether the target object exists inside the screen.

22. A processor-implemented method, comprising:
- detecting one or more objects in a received image;

detecting a center point of a camera based on a movement of the camera;

detecting a first object, among the one or more objects, whose center point coincides with the center point of the camera as a target object, depending on whether the target object is changed to a second object, including changing the target object from the first object to the second object based on a result of determining whether a center point of the camera is located at a center point of the second object;

detecting a region of interest (ROI) in the target image; and performing one of a zoom-in operation and a zoom-out operation based on an increase or a decrease of a distance between the center point of the camera and the ROI.

23. The method of claim 22, further comprising detecting an object among one or more objects in the received image, whose center point coincides with the center point of the camera, as the target object.

24. The method of claim 22, further comprising performing a zoom-out operation when the distance between the center point of the camera and the ROI of the target object increases, and performing a zoom-in operation when the distance between the center point of the camera and the ROI of the target object decreases.

* * * * *